US012201585B2

(12) United States Patent
Poola et al.

(10) Patent No.: US 12,201,585 B2
(45) Date of Patent: Jan. 21, 2025

(54) MEDICAL DEVICE, MEDICAL DEVICE ASSEMBLY INCLUDING THE SAME, AND METHOD OF RECONSTITUTION OF A PHARMACEUTICAL COMPOSITION

(71) Applicant: Becton, Dickinson and Company, Franklin Lakes, NJ (US)

(72) Inventors: Rajesh Poola, Tamil Nadu (IN); Ambicai Venkatachalapathy, Tamil Nadu (IN)

(73) Assignee: Becton, Dickinson and Company, Franklin Lakes, NJ (US)

(*) Notice: Subject to any disclaimer, the term of this patent is extended or adjusted under 35 U.S.C. 154(b) by 466 days.

(21) Appl. No.: 17/624,083

(22) PCT Filed: Jul. 2, 2020

(86) PCT No.: PCT/IB2020/056266
§ 371 (c)(1),
(2) Date: Dec. 30, 2021

(87) PCT Pub. No.: WO2021/001786
PCT Pub. Date: Jan. 7, 2021

(65) Prior Publication Data

US 2022/0354746 A1 Nov. 10, 2022

(30) Foreign Application Priority Data

Jul. 3, 2019 (EP) ..................................... 19184249

(51) Int. Cl.
*A61J 1/20* (2006.01)

(52) U.S. Cl.
CPC ............. *A61J 1/2048* (2015.05); *A61J 1/201* (2015.05); *A61J 1/2089* (2013.01); *A61J 1/2096* (2013.01)

(58) Field of Classification Search
CPC ...... A61J 1/2089; A61J 1/2096; A61J 1/2048; A61J 1/201; A61J 1/2055; A61J 1/2051; A61J 1/2065; A61J 1/2003; A61M 2039/1044; A61M 2039/1072; A61M 2005/3118; A61M 2039/1027; A61M 39/1011; A61M 5/158; A61M 5/32
See application file for complete search history.

(56) References Cited

U.S. PATENT DOCUMENTS 4,667,837 A * 5/1987 Vitello ................ A61M 5/5086
215/253
5,397,303 A * 3/1995 Sancoff ................ A61J 1/1425
604/82

(Continued)

FOREIGN PATENT DOCUMENTS

EP 3295918 A1 3/2018
JP 2005143677 A 6/2005

(Continued)

*Primary Examiner* — Adam Marcetich
(74) *Attorney, Agent, or Firm* — The Webb Law Firm

(57) ABSTRACT

A medical device is configured to be connectable with a vial. The medical device includes a tubular body and an adapter. The tubular body defines a container for containing a composition, and has a spike located at a distal end thereof. The spike has at least one through hole in fluid communication with the container. The adapter is formed with or coupled to the body, and is located at or about the spike.

14 Claims, 11 Drawing Sheets

(56) References Cited

U.S. PATENT DOCUMENTS 5,766,147 A * 6/1998 Sancoff ................. A61J 1/2089 141/2
6,524,278 B1 * 2/2003 Campbell ........... A61M 5/3202 604/110
9,402,967 B1 * 8/2016 Vitello ................ A61M 5/5086
2003/0125671 A1 * 7/2003 Aramata ............... A61J 1/2096 604/236
2003/0212372 A1 * 11/2003 Bills ................... A61M 5/3134 604/236
2004/0039365 A1 * 2/2004 Aramata ............... A61J 1/2096 604/82
2005/0209553 A1 * 9/2005 Landau ................... A61M 5/30 604/72
2007/0078428 A1 * 4/2007 Reynolds .............. A61J 1/2096 604/411
2010/0152669 A1 * 6/2010 Rosenquist ........... A61M 39/10 604/257
2011/0160701 A1 6/2011 Wyatt et al.
2012/0168464 A1 * 7/2012 Koyama ............. A61M 5/5086 222/153.06
2014/0012204 A1 * 1/2014 Bosshardt .......... A61M 39/1011 604/187
2014/0014210 A1 * 1/2014 Cederschiold ...... A61M 5/3286 53/381.2
2014/0276649 A1 * 9/2014 Ivosevic ............... A61J 1/2096 604/533
2015/0011936 A1 * 1/2015 Okihara ................ A61M 5/344 604/111
2015/0209230 A1 * 7/2015 Lev ....................... A61J 1/2096 604/414
2015/0246184 A1 * 9/2015 Hund .................... A61M 5/345 604/240
2015/0250681 A1 * 9/2015 Lev ....................... A61J 1/2048 604/414
2015/0297462 A1 * 10/2015 Lev ......................... A61J 1/201 604/407
2016/0136412 A1 * 5/2016 McKinnon ......... A61M 39/1011 604/535
2017/0065486 A1 * 3/2017 Mosler .................. A61J 1/2055
2017/0151129 A1 * 6/2017 Limaye ............... A61M 5/3213
2018/0161524 A1 * 6/2018 Flippe ................... A61M 5/349
2019/0159969 A1 5/2019 Porter et al.
2019/0275313 A1 * 9/2019 Godin ................... A61M 39/20
2020/0179619 A1 * 6/2020 Sonoyama .............. A61M 5/31
2020/0238023 A1 * 7/2020 Murray ................... B65B 3/003
2022/0355036 A1 * 11/2022 Garrec ................ A61M 5/3134
2023/0241325 A1 * 8/2023 Rivier ...................... A61M 5/32 604/19

FOREIGN PATENT DOCUMENTS

WO 2015/002646 A1 1/2015
WO 2016181826 A1 11/2016

* cited by examiner

MEDICAL DEVICE, MEDICAL DEVICE ASSEMBLY INCLUDING THE SAME, AND METHOD OF RECONSTITUTION OF A PHARMACEUTICAL COMPOSITION

CROSS-REFERENCE TO RELATED APPLICATIONS

This application is the United States national phase of International Application No. PCT/IB2020/056266 filed Jul. 2, 2020, and claims priority to European Application No. 19184249.1 filed Jul. 3, 2019, the entire disclosures of which are hereby incorporated by reference in their entirety.

BACKGROUND

Field of the Disclosure

The present disclosure relates generally to medical devices, and more specifically to medical device assemblies including medical devices. The present disclosure also relates to methods of reconstitution of a pharmaceutical composition.

Description of the Related Art

In the field of medicament packaging, it is known to store a drug content, in the form for example of a lyophilized drug, a power drug, or an active substance of a drug, in a medical container usually referred to as a “vial”. A vial is typically made of glass and is sealed by an elastomeric septum that is crimped by an aluminum cap. A portion of elastomer at the center of the septum is covered by a plastic or aluminum part. This part can be removed by a healthcare professional prior to the reconstitution procedure so that the healthcare professional can have access to a center portion made of rubber, which can be pierced by a needle of an injection device such as a syringe.

To reconstitute the drug, the user usually uses a disposable syringe to transfer the diluent from an ampoule or a vial into the vial containing the lyophilized drug or power drug. When the diluent is already stored in a prefilled syringe, the healthcare professional transfers the diluent directly from the syringe to the vial containing the lyophilized drug. The healthcare professional uses a needle for this transfer in order to pierce the rubber septum of the vial.

However, this process commonly involves a number of steps. First, a standard needle may be attached to a syringe that is pre-filled with diluent. Second, the needle may be used to pierce a stopper of a vial containing the dry vaccine. Finally, the dry vaccine and diluent are mixed, and the solution is aspirated back into the syringe for administration, typically by piercing the vial stopper with the needle. It is an object of this invention to provide an improvement over this technique, which suffers from a number of drawbacks.

Indeed, during the whole process, the needle tip may be damaged due to the removal of the needle shield, piercing of the septum of the vial, and/or misalignment during insertion of the needle. A damaged or bent needle, or a needle which may contain burs, is thus significantly less sharp than it was before piercing the vial stopper during reconstitution, which may cause pain to a patient during the injection of the drug.

Another major drawback of the known processes is that, when the user withdraws the reconstituted drug from the vial through the needle, the user needs to adjust the length of the portion of the needle that is inserted in the vial as the amount of drug in the vial decreases. In a practical way, the user needs to slowly draw the needle back from the container by pulling the syringe away from the vial, so that the opening of the needle constantly remains in contact with the drug, in other terms, below the surface of the drug. Not only is this handling hard to perform, but also such movement of the needle in the vial may lead to a loss of a significant amount of drug that remains in the vial.

SUMMARY

In one aspect, a medical device is provided. The medical device is configured to be connectable with a vial. The medical device includes a tubular body and an adapter. The tubular body defines a container for containing a composition, and has a spike located at a distal end thereof. The spike has at least one through hole in fluid communication with the container. The adapter is formed with or coupled to the body, and is located at or about the spike.

In another aspect, a medical device assembly including a plunger and the aforementioned medical device is provided.

In another aspect, a method of reconstitution of a pharmaceutical composition is provided. The method includes providing the aforementioned medical device assembly, connecting the adapter with the vial, the vial containing a solid drug, injecting a quantity of diluent from the medical device assembly into the vial, mixing the diluent and the solid drug in the vial to create a reconstituted pharmaceutical composition, aspirating the reconstituted pharmaceutical composition from the vial into the body, and detaching the adapter from the body.

BRIEF DESCRIPTION OF THE DRAWINGS

The above-mentioned and other features and advantages of this disclosure, and the manner of attaining them, will become more apparent and the disclosure itself will be better understood by reference to the following descriptions of embodiments of the disclosure taken in conjunction with the accompanying drawings, wherein.

Corresponding reference characters indicate corresponding parts throughout the several views. The exemplifications set out herein illustrate exemplary aspects of the disclosure, and such exemplifications are not to be construed as limiting the scope of the disclosure in any manner.

DETAILED DESCRIPTION

Figure 1:
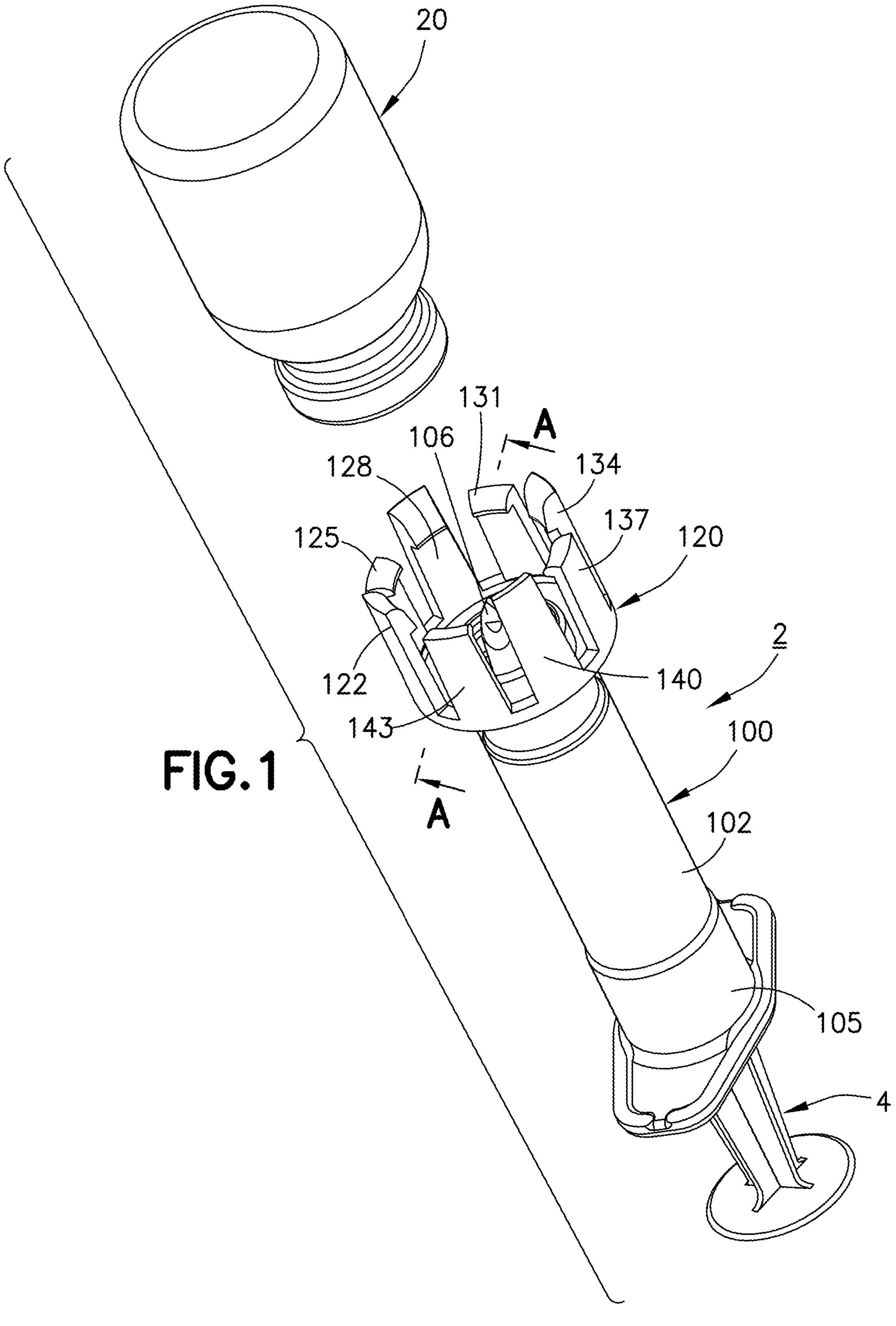
FIG. 1 is an isometric view of a medical device assembly and medical device for the same, shown with a vial spaced apart from the medical device assembly, in accordance with one non-limiting embodiment of the disclosed concept.

The following description is provided to enable those skilled in the art to make and use the described embodiments contemplated for carrying out the concept. Various modifications, equivalents, variations, and alternatives, however, will remain readily apparent to those skilled in the art. Any and all such modifications, variations, equivalents, and alternatives are intended to fall within the spirit and scope of the present concept.

For purposes of the description hereinafter, the terms "upper", "lower", "right", "left", "vertical", "horizontal", "top", "bottom", "lateral", "longitudinal", and derivatives thereof shall relate to the concept as it is oriented in the drawing figures. However, it is to be understood that the concept may assume various alternative variations, except where expressly specified to the contrary. It is also to be understood that the specific devices illustrated in the attached drawings, and described in the following specification, are simply exemplary embodiments of the concept. Hence, specific dimensions and other physical characteristics related to the embodiments disclosed herein are not to be considered as limiting.

As employed herein, the term "distal" shall mean a generally patient-contacting end of an object. As employed herein, the term "proximal" shall mean a location farthest from a distal location of an object.

As employed herein, the term "number" shall mean one or an integer greater than one (e.g., a plurality).

Figure 2:
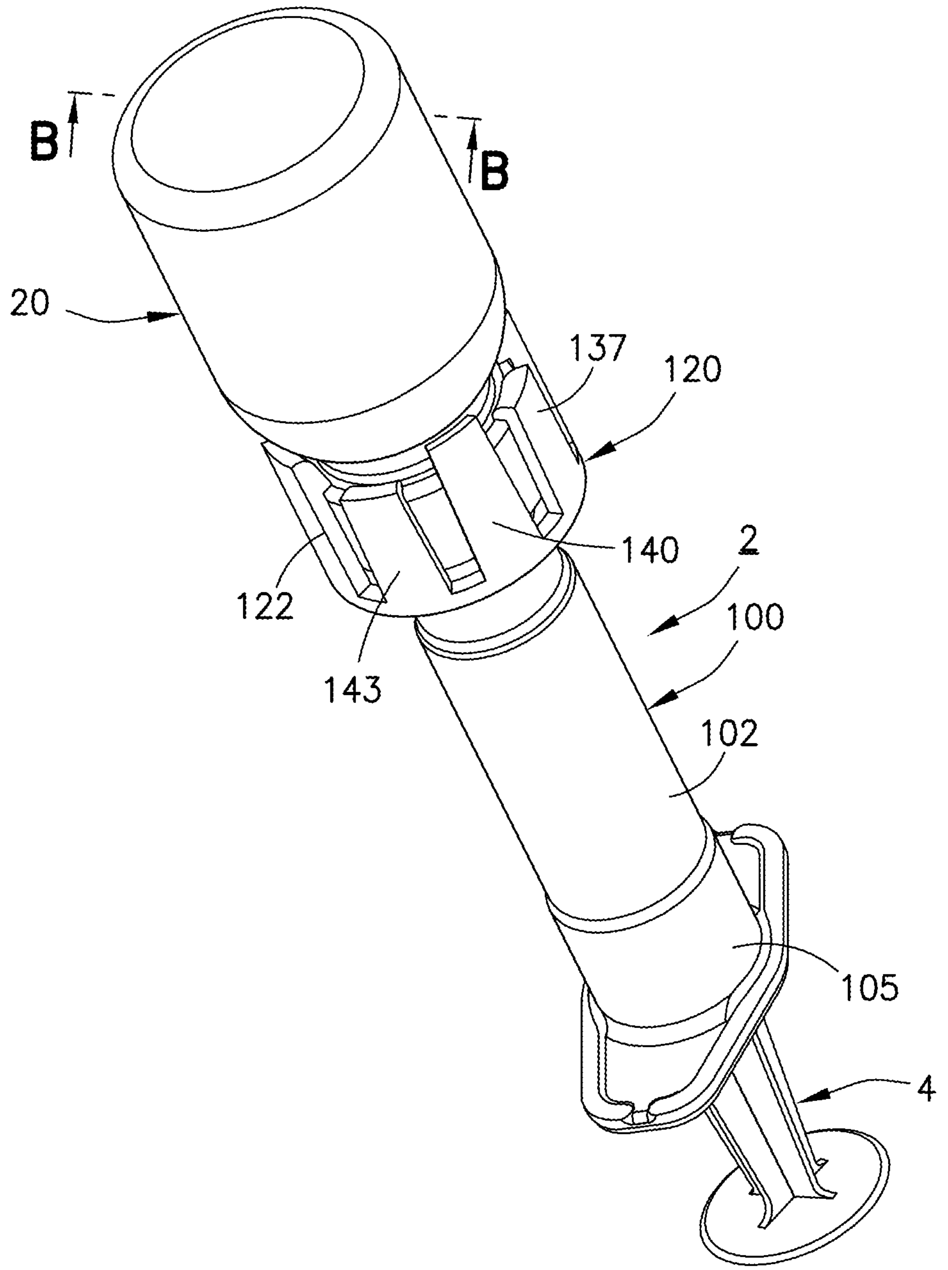
FIG. 2 is another isometric view of the medical device assembly and medical device for the same of FIG. 1, and shown with the vial connected to the medical device assembly.

FIG. 1 shows an isometric view of a medical device assembly 2 and medical device 100 for the same, and shown with a vial 20 spaced from the medical device assembly 2, in accordance with one non-limiting embodiment of the disclosed concept. In one example non-limiting embodiment, the medical device assembly 2 is a syringe assembly, and the medical device 100 is a syringe barrel. However, it will be appreciated that suitable alternative medical devices and assemblies are contemplated herein. The medical device assembly 2 can generally be stated as including a plunger 4 and the medical device 100. The plunger 4 is partially located within the medical device 100 and is configured to slide within the medical device 100 in order to move a solution into and out of the medical device 100. FIG. 2 shows the medical device assembly 2 connected to the vial 20. Typically, the vial 20 will be closed by a pierceable septum. The vial 20 may initially contain a solid drug, such as a dry vaccine and the medical device assembly 2 may initially contain a pharmaceutical composition such as a diluent. When the medical device assembly 2 is connected to the vial 20, as shown in FIG. 2, the solid drug and pharmaceutical composition can be mixed by expelling the pharmaceutical composition into the vial 20, and the resultant composition, such as a vaccine, can be aspirated back into the medical device assembly 2 for administration to a patient. This process will be further discussed below, along with advantages associated with employing the medical device assembly 2 and medical device 100 for the same, such as protecting medical practitioners from undesirable injury during reconstitution and/or administration of vaccines.

Figure 3:
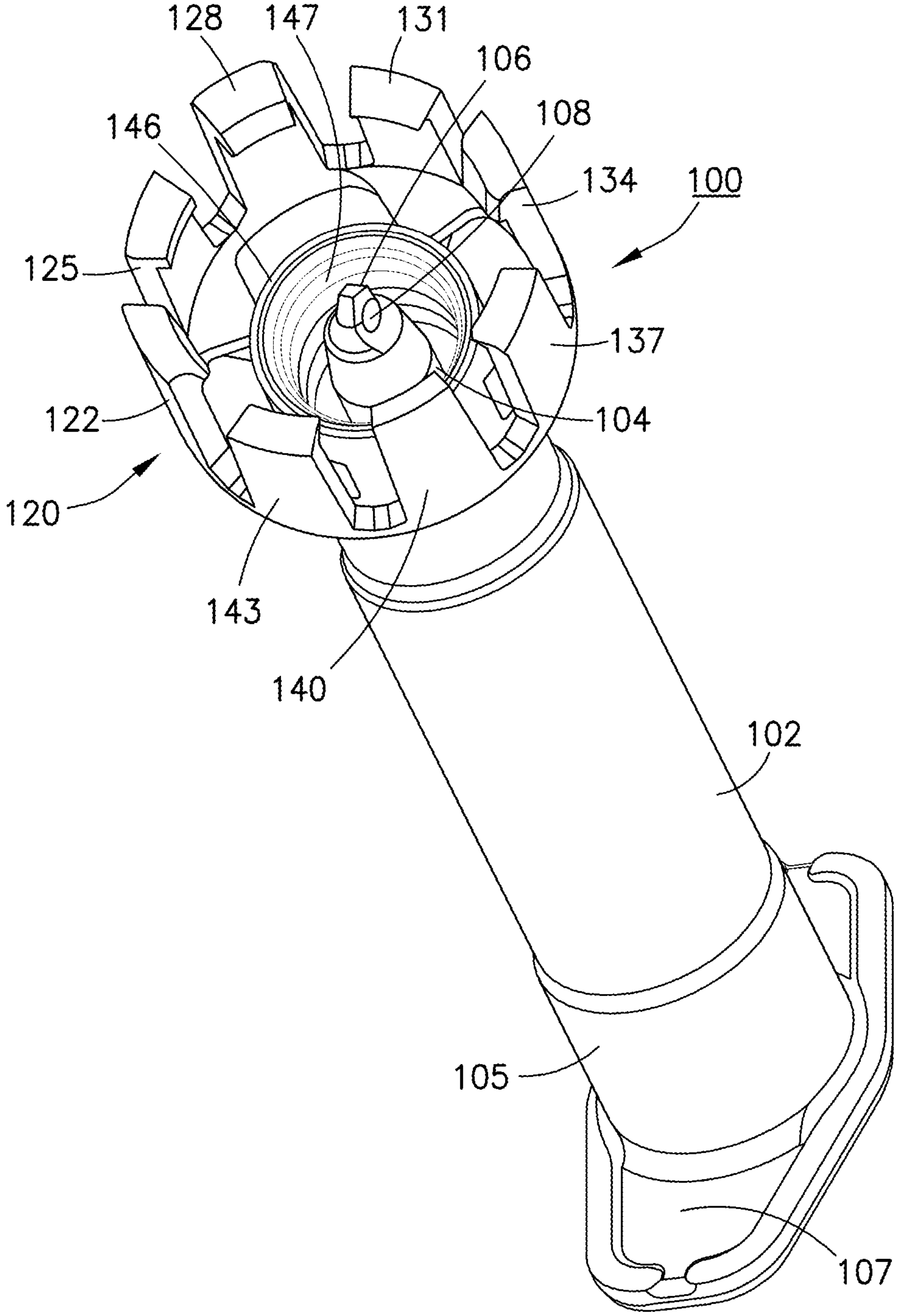
FIG. 3 is a front isometric view of the medical device of FIG. 1.
Figure 4:
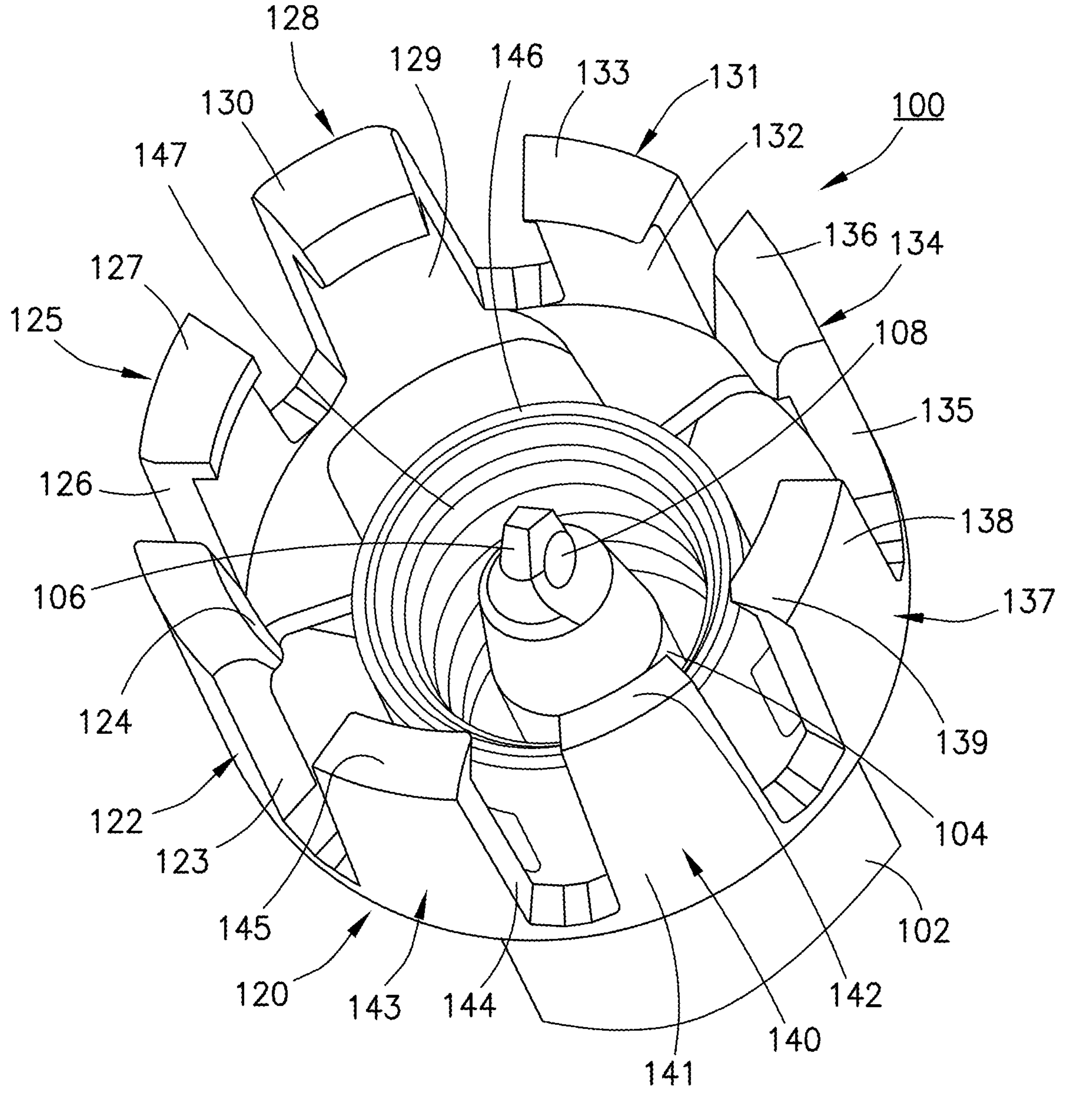
FIG. 4 is an enlarged view of a portion of the medical device of FIG. 3.

FIG. 3 shows an isometric view of the medical device 100, and FIG. 4 shows an enlarged view of a portion of the medical device 100 of FIG. 3. As shown in FIG. 3, the medical device 100 has a tubular body 102 having a distal end 104 and an opposite and spaced apart, proximal end 105. The body 102 further has a spike 106 located at the distal end 104, and the spike 106 is preferably hollow and has at least one through hole 108, 110 (see also FIG. 5) in order to allow a solution to exit and enter the body 102. In the exemplary embodiment, it will be appreciated that manufacturing the medical device 100 is advantageously simplified by employing more than one through hole 108, 110 in the spike 106. However, suitable alternative embodiments, such as those with a spike having only one single through hole, are contemplated herein. The medical device 100 also includes a flange 107 extending from the proximal end 105 of the body 102, and in one example embodiment, being located generally perpendicular with respect to, the body 102. The medical device 100 further includes an adapter 120 formed with or coupled to the body 102. As such, it will be appreciated that the body 102 and the adapter 120 may be a unitary component made from one single piece of material, e.g., an injection molded piece wherein the piece of material is formed from one or more polymers. When connecting the medical device 100 having the adapter 120 to a vial, the spike 106 is configured to pierce the septum of the vial to allow the reconstitution of a drug.

Continuing to refer to FIG. 4, the example adapter 120 is located at or about the spike 106, and has a number of deflector members (eight example deflector members 122, 125, 128, 131, 134, 137, 140, 143 are shown in FIG. 4) each configured to be connectable with the vial 20 (FIGS. 1 and 2). The deflector members 122, 125, 128, 131, 134, 137, 140, 143 may be a plurality of deflector members 122, 125, 128, 131, 134, 137, 140, 143 surrounding the spike 106, and configured to deflect radially inwardly and outwardly with respect to the spike 106. Advantageously, the adapter 120 includes from two to ten deflector members, preferably from four to eight deflector members. Typically, an adapter member will include four, five, six, seven or eight deflector members. Preferably, each of the deflector members 122, 125, 128, 131, 134, 137, 140, 143 includes an elongated member 123, 126, 129, 132, 135, 138, 141, 144 and a tooth 124, 127, 130, 133, 136, 139, 142, 145 extending inwardly from the elongated member toward a longitudinal axis (see, for example, longitudinal axis 103 shown in FIG. 5) of the body 102. Advantageously, each of the elongated members 123, 126, 129, 132, 135, 138, 141, 144 extends parallel to a longitudinal axis, such as axis 103.

Figure 5:
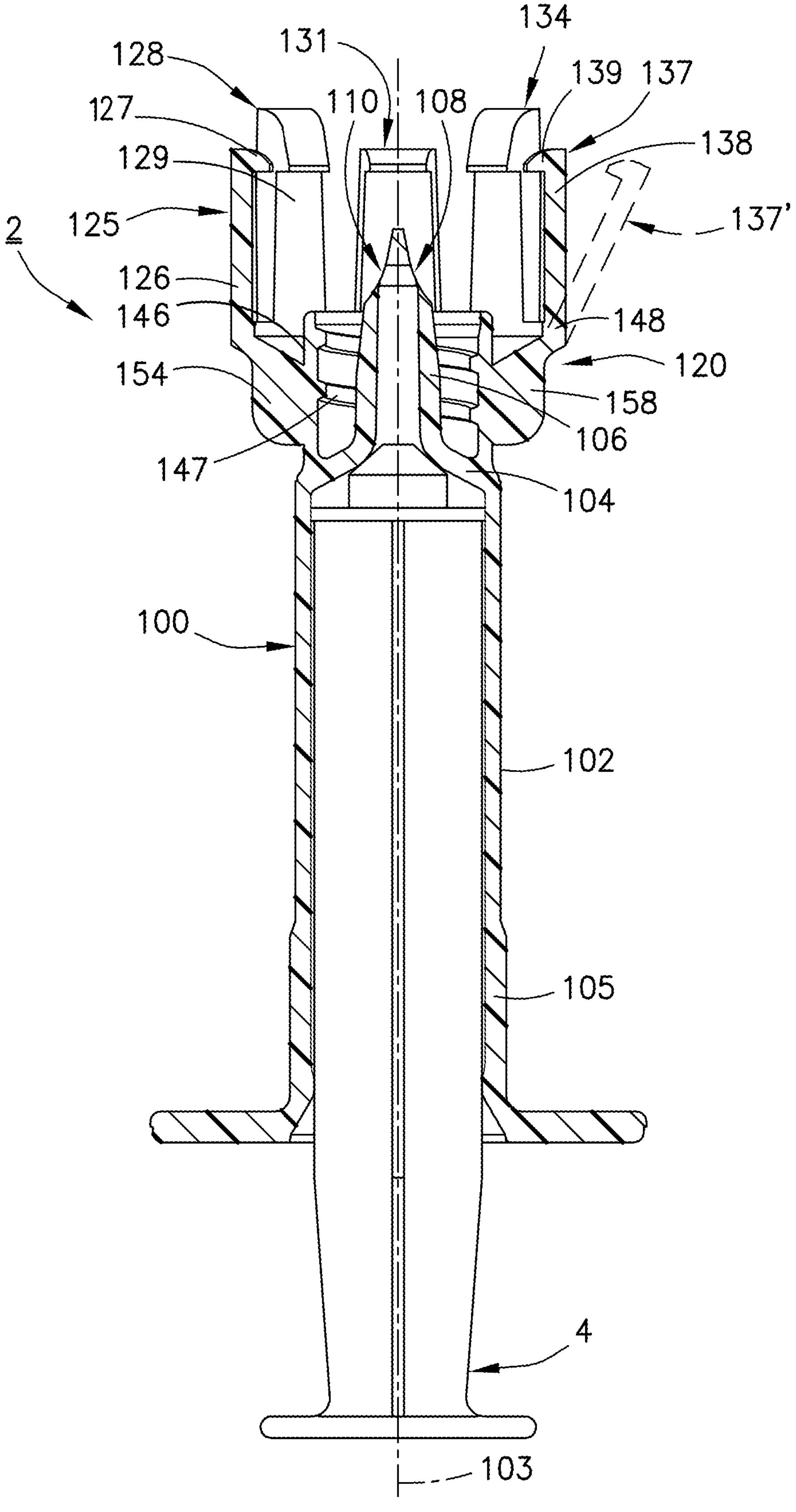
FIG. 5 is a section view of the medical device assembly of FIG. 1, taken along line A-A of FIG. 1, but shown with the plunger moved to a fully depressed position.

Referring to FIG. 5, functionality of the deflector member 137 will now be discussed. While the deflector member 137 is being discussed herein, it will be appreciated that each of the other example deflector members 122, 125, 128, 131, 134, 140, 143 functions substantially the same as the deflector member 137. As shown in FIG. 5, the elongated member 138 of the deflector member 137 has an end portion 148 located opposite and proximally from the tooth 139 of the deflector member 137. FIG. 5 further shows the deflector member 137 in a first position in solid line drawing, and in a second, deflected position 137' in dashed line drawing. As shown, the deflected position 137' corresponds to the deflector member 137 having been radially outwardly deflected about the end portion 148. More specifically, deflected position 137' preferably corresponds to the position of the deflector member 137 when the vial 20 (FIGS. 1 and 2) and the medical device 100 are being moved into a connected position with respect to each other. Thus, during this movement, the vial 20 causes the deflector member 137 to initially deflect radially outwardly, e.g., to the deflected position 137', and then move back radially inwardly to the non-deflected position, shown in solid line drawing in FIG. 5. In one example embodiment, each of the deflector members 122, 125, 128, 131, 134, 137, 140, 143 are configured to be connectable with the vial 20 via a snap-fit mechanism. Accordingly, the deflector members 122, 125, 128, 131, 134, 137, 140, 143 are preferably biased toward the non-deflected positions. As such, subsequent to moving radially inwardly, the teeth (see teeth 127,139 in FIG. 9) advantageously maintain the connection between the vial 20 and the medical device 100, thereby allowing for fluid communication between the vial 20 and the medical device 100. Specifically, when the vial 20 is connected to the medical device 100, at least a portion of the vial 20 is located between the teeth 124, 127, 130, 133, 136, 139, 142, 145 and the spike 106 in order to provide for a relatively secure connection between the adapter 120 and the vial 20. See FIG. 9 for purposes of illustration. Although the disclosed concept has been discussed so far in conjunction with the adapter 120 having deflector members 122, 125, 128, 131, 134, 140, 143 to allow for connection to the vial 20, it will be appreciated that suitable alternative connection mechanisms and/or adapters having different geometries (not shown) are contemplated herein.

Moreover, as shown in FIG. 5, it will be appreciated that not all deflector members 122, 125, 128, 131, 134, 137, 140, 143 may be configured to have the exact same geometry. For example, the deflector member 128 is longer than the deflector member 125, which is located adjacent the deflector member 128.

Figure 7:
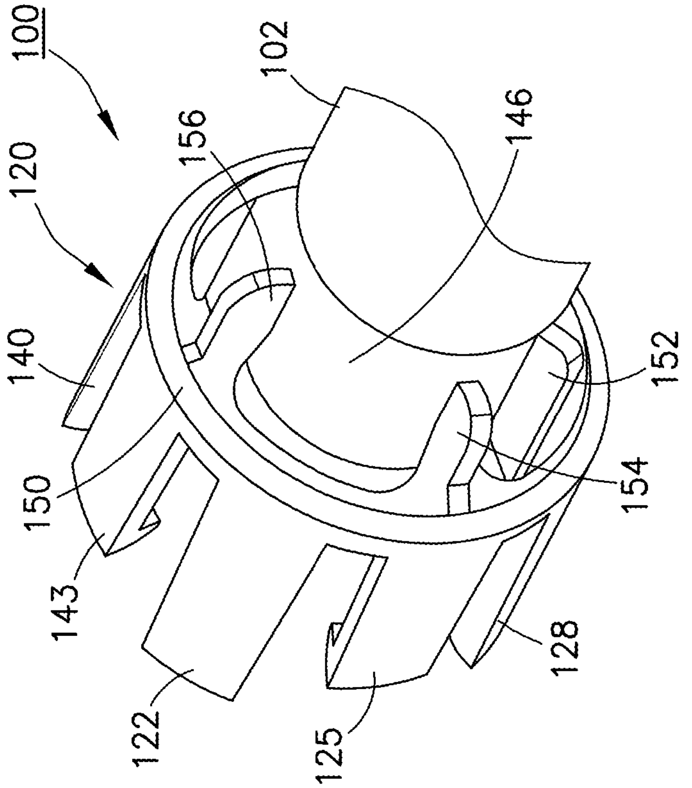
FIG. 7 is an enlarged view of a portion of the medical device of FIG. 6
Figure 6:
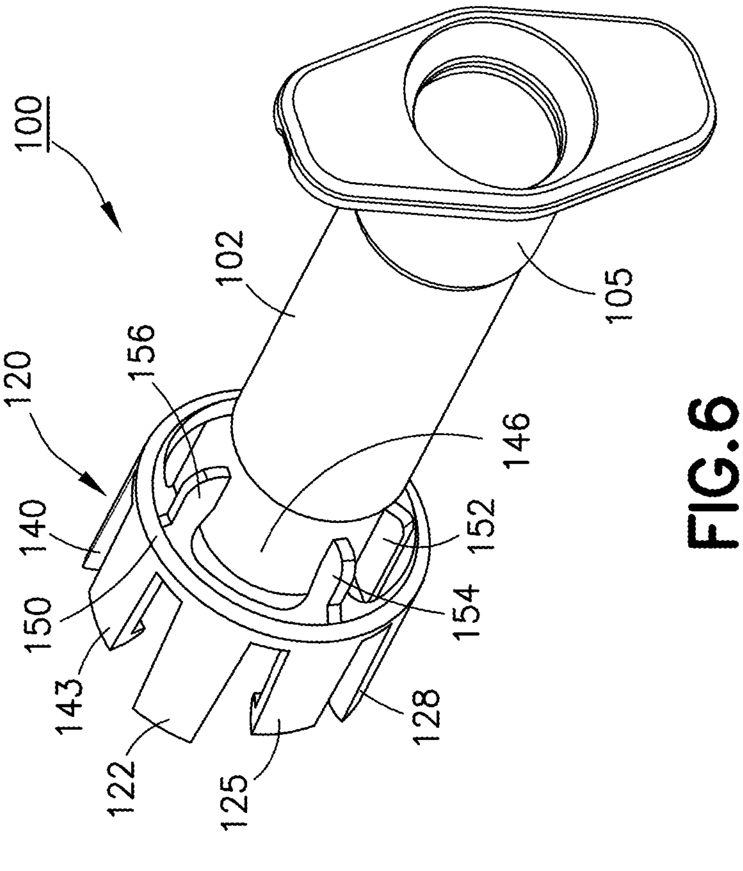
FIG. 6 is a rear isometric view of the medical device of FIG. 1.

FIG. 6 is a rear isometric view of the medical device 100 and FIG. 7 is an enlarged view of a portion of the medical device 100 of FIG. 6. As shown, the adapter 120 has an annular-shaped base portion 150. The adapter 120 further comprises a number of attachment portions 152, 154, 156, 158 (see also FIG. 5) extending from the base portion 150 to the wall 146. The adapter may comprise at least two attachment portions, preferably between two and six attachment portions, more preferably the adapter comprises four attachment portions 152, 154, 156, 158. The attachment portions 152, 154, 156, 158 may be attached to the wall 146 at spaced apart isolated locations. The attachment portions 152, 154, 156, 158 may be formed together, for example by injection molding. The base portion 150 generally surrounds the spike 106 and is preferably concentric with the wall 146. However, suitable alternative arrangements are contemplated herein. Furthermore, the attachment portions 152, 154, 156, 158 are configured to be selectively removed from the wall 146 responsive to rotation of the adapter 120 with respect to the body 102. The attachment portions 152, 154, 156, 158 are thus breakable from the wall 146 from which they were previously attached. Accordingly, the entire adapter 120, in one example embodiment, is removably attached to wall 146 such that grasping and rotating the adapter 120 with respect to the tubular body 102 causes the adapter 120 to detach from the rest of the medical device 100. Thus, the attachment portions 152, 154, 156, 158 preferably provide the only location at which the adapter 120 is attached to the body 102, and advantageously provide a relatively strong mechanism for attachment, but weak enough to allow for selective removal of the entire adapter 120 from the body 102. The detachment of the adapter 120 from the medical device 100 is advantageously irreversible. The purpose of this attribute of the medical device 100 will be discussed below.

Figure 10:
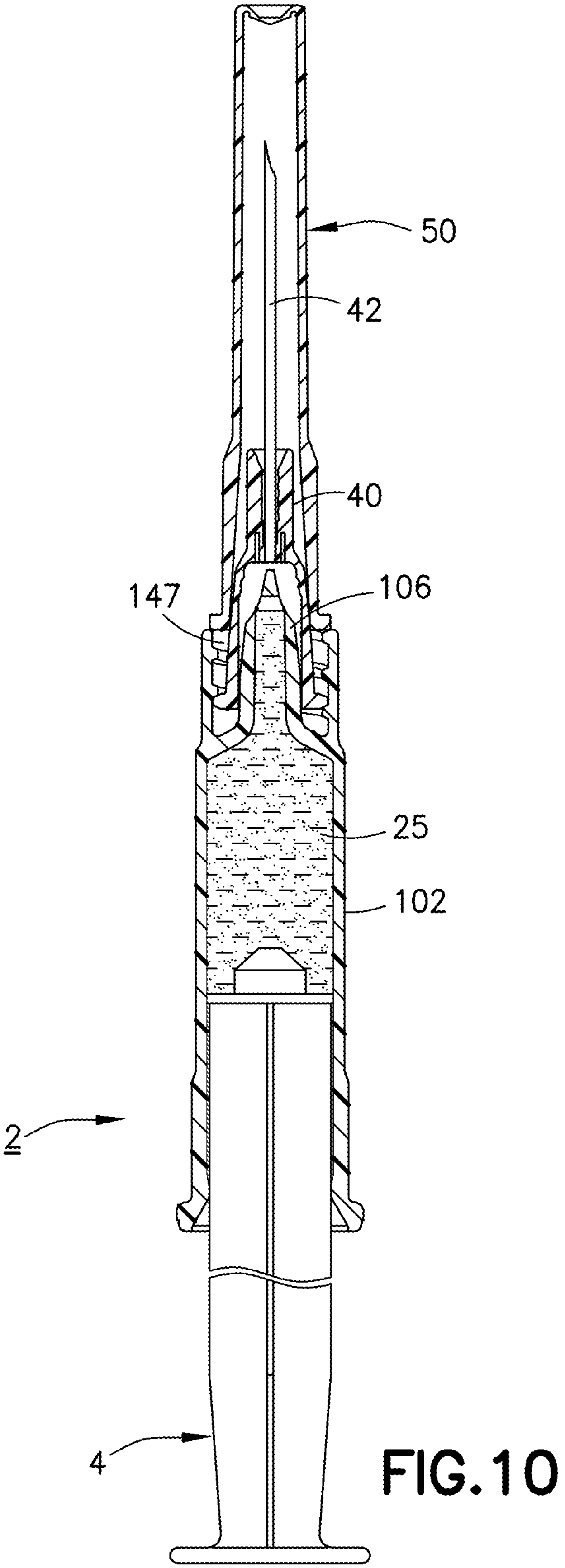
FIG. 10, a section view taken along line C-C of FIG. 11, shows the medical device assembly wherein the adapter is detached and with additional components connected to the medical device, in accordance with an embodiment of the disclosed concept.

In addition to being configured to be connectable with the vial 20, the adapter 120 is configured to be connectable with a needle hub, such as needle hub 40 shown in FIG. 10. In one example embodiment, in order to provide for this connection, the adapter 120 further includes an annular-shaped wall 146 extending distally from the body 102, shown in FIG. 4, and through which the spike 106 extends. The external surface of the wall 146 may extend distally from the tubular body 102. The wall 146 may have a threaded inner surface 147 configured to be threadably connected with the needle hub 40. However, suitable other connection mechanisms between adapters and needle hubs are within the scope of the disclosed concept.

Figures 8A, 8B, 8C, 8D, 8E:
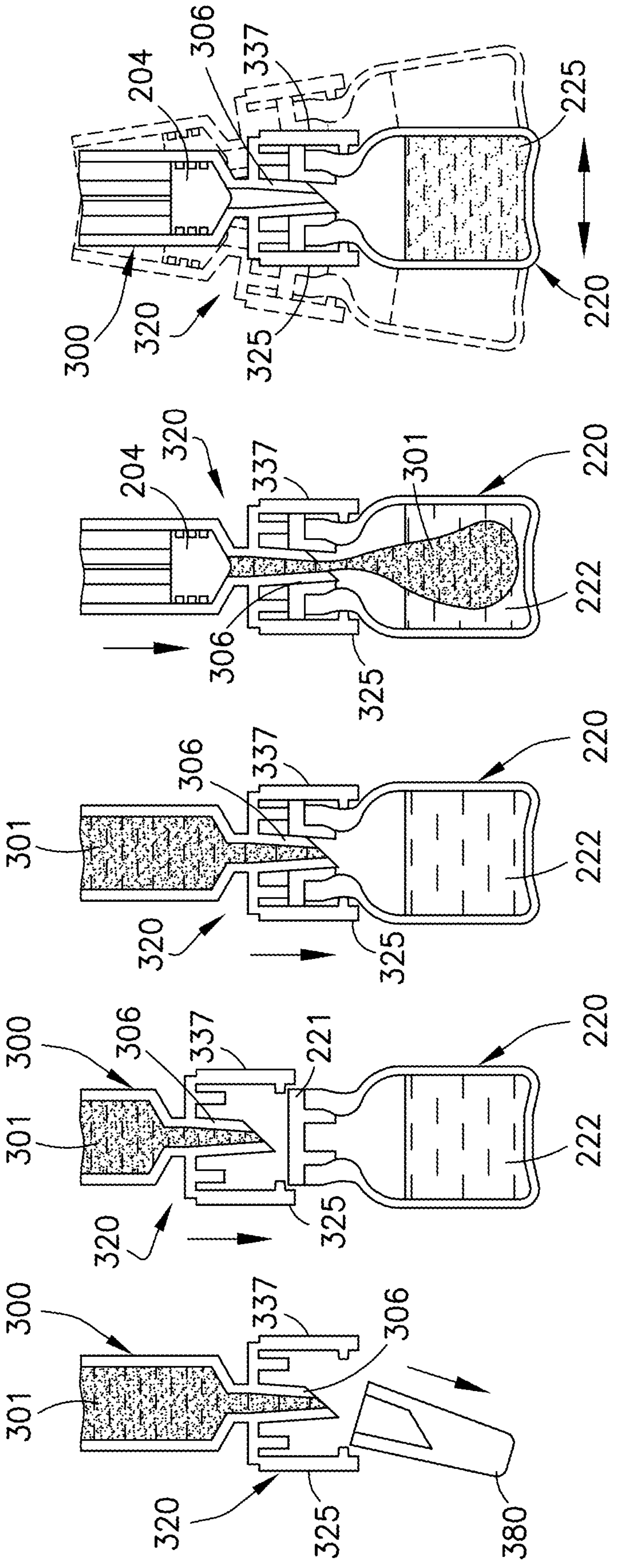
FIGS. 8A-8J show simplified views of aspects of the disclosed concept, employed to prepare a reconstituted drug for administration to a patient, in accordance with one non-limiting embodiment of the disclosed concept.

FIGS. 8A-8J show one process by which the disclosed concept may be employed. Simplified depictions, not drawn to scale, of a plunger 204, a vial 220, a medical device 300, and additional components, are shown. It will be appreciated that these components function substantially the same as the medical device assembly 2, vial 20, and components to be used in conjunction therewith, and like numbers represent like components. As shown in FIG. 8A, first a spike cap 380 may be removed from the spike 306. Next, as shown in FIGS. 8B and 8C, the adapter 320, e.g., and the deflector members 325, 337, are connected with the vial 220. As the vial 220 and adapter 320 are being connected, the spike 306 pierces a septum or stopper 221 of the vial to provide a fluid pathway between an interior of the vial 220 and an interior of the medical device 300. Next, as shown in FIG. 8D, the plunger 204 has been depressed in order to move a quantity of diluent 301 from the medical device 300 into the vial 220, which contains a quantity of solid drug 220. As shown in FIG. 8E, shaking of the vial 220 causes the diluent and solid drug to mix, resulting in a mixed reconstituted pharmaceutical composition 225.

Figure 8F:
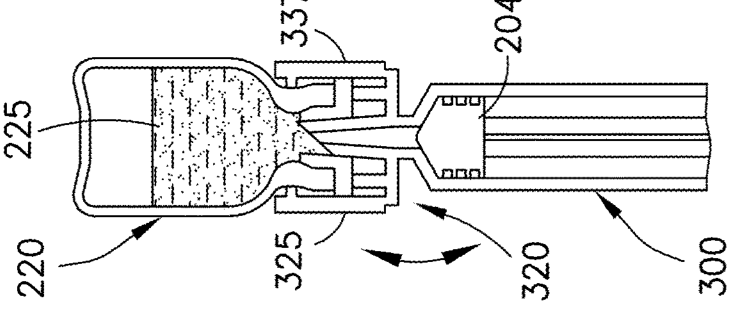
Figure 8G:
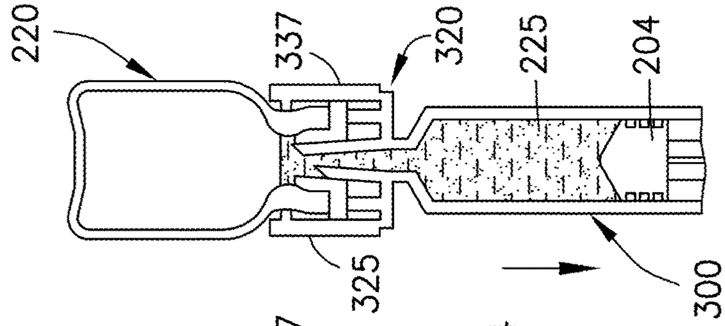
Figure 8H:
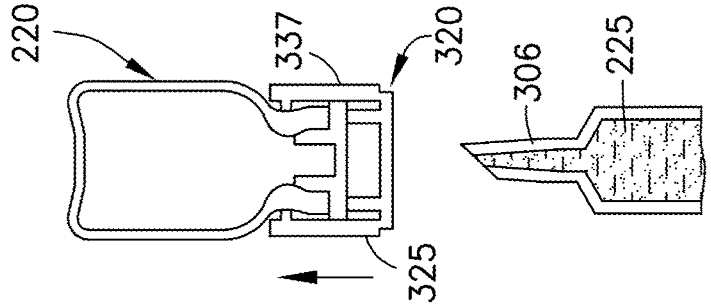
Figure 8I:
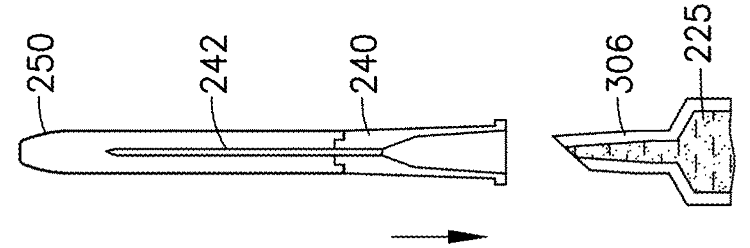
Figure 8J:
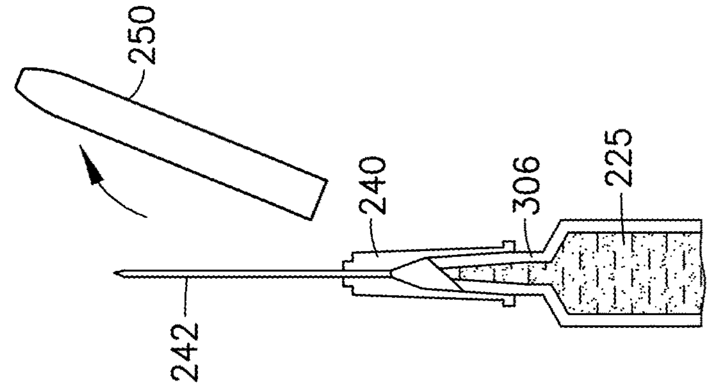

FIGS. 8F and 8G depict the mixed reconstituted pharmaceutical composition 225 being aspirated back into the interior of the medical device 300 by the plunger 204. In FIG. 8H, the adapter 320 and vial 220 have together been rotated off of, e.g., detached from, the spike 306. Although a wall, similar to wall 146 above, has not been shown with the medical device 300, it will be appreciated that detachment of the adapter 120 from the wall 146 may be achieved in a similar manner by which the adapter 320 is detached from the spike 306. See, for example, discussion above with reference to the attachment portions 152, 154, 156, 158 being detached from the wall 146 via rotation by a user. With the adapter 320 detached from the spike 306, the needle hub 240 may readily be connected to the spike 306, as shown in FIGS. 8I and 8J. While shown in FIGS. 8I and 8J as being connected to the spike 306 via a press-fit mechanism, it will be appreciated that the needle hub 240 may be connected to the spike 306, or a suitable alternative portion of the adapter 320, via any suitable alternative coupling mechanism, e.g., without limitation, via a threaded connection or being snap-fitted onto the spike 306. Subsequently, removal of a needle shield 250 from the needle hub 240 presents a needle 242 prepared for use with a patient. Because the needle 242 has not been previously employed for use with creating the reconstituted pharmaceutical composition 225, e.g., the needle 242 was not inserted into the stopper 221 and used to inject diluent and aspirate the reconstituted pharmaceutical composition 225 back into the medical device 300, the needle 242 is advantageously in a safer condition for use with the patient. Specifically, problems of existing methods, such as burs being created by needles piercing stoppers and needles losing their sharpness as a result of piercing stoppers, are solved by employing the medical device 300, e.g., and the medical device 100 discussed above, which use the spikes 106, 306 for this function.

Figure 9:
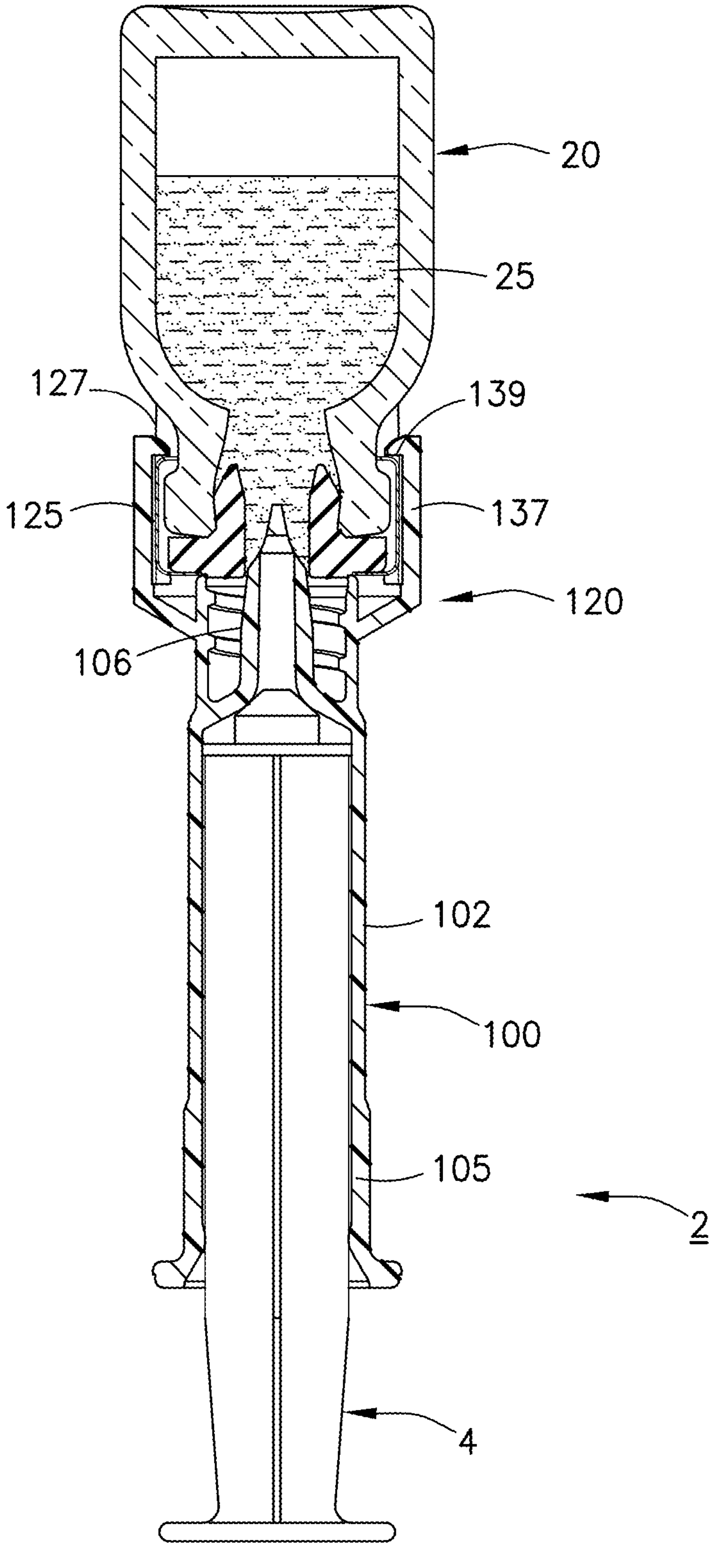
FIG. 9 is a section view of the medical device assembly of FIG. 2, shown with the vial containing a mixed reconstituted drug, and taken along line B-B of FIG. 2.
Figure 11:
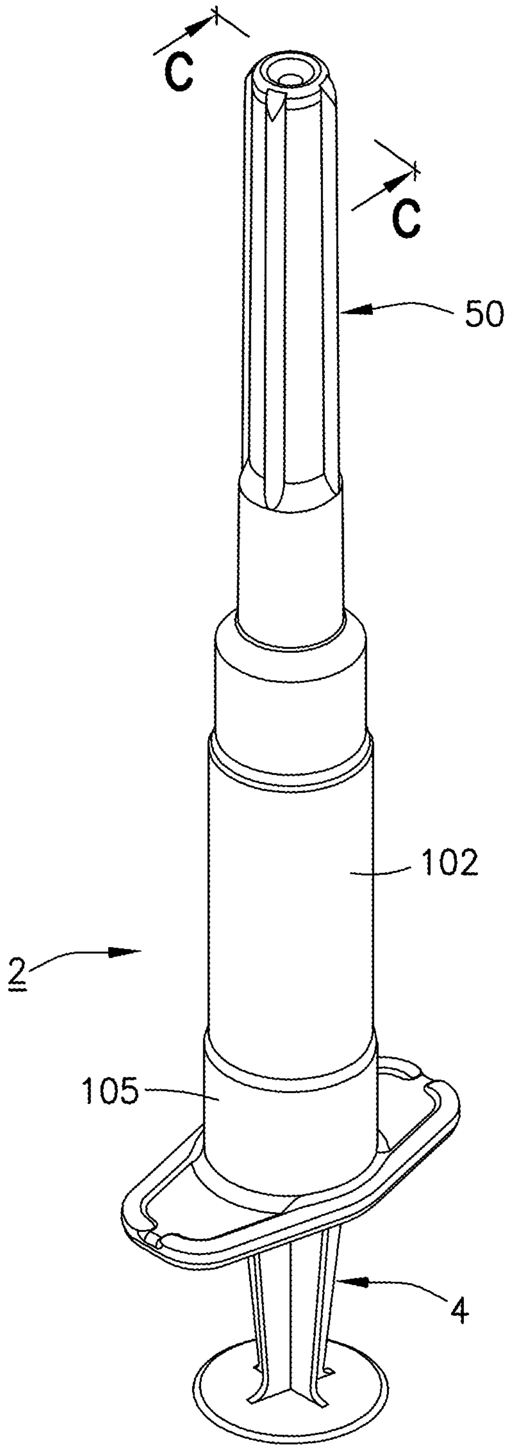
FIG. 11 is an isometric view of the medical device assembly and components of FIG. 10.

FIG. 9 shows the medical device assembly 2 connected to the vial 20, with the diluent and solid drug mixed in the vial 20, resulting in the reconstituted pharmaceutical composition 25. FIG. 10 shows the medical device assembly 2 with the adapter 120 having been detached, in the manner discussed above, and with the reconstituted pharmaceutical composition 25 having been aspirated back into the body 102. Furthermore, a needle hub 40 has been threadably connected to the threaded inner surface 147. Accordingly, a needle 42, which is connected to the needle hub 40, is in a relatively safe condition for use with a patient, for the same reasons discussed above in connection with FIGS. 8A-8J. Thus, removal of a needle shield 50 (also shown in FIG. 11) from the needle hub 40 exposes the relatively sharp and substantially bur-free needle 42 for use with a patient.

Figure 12:
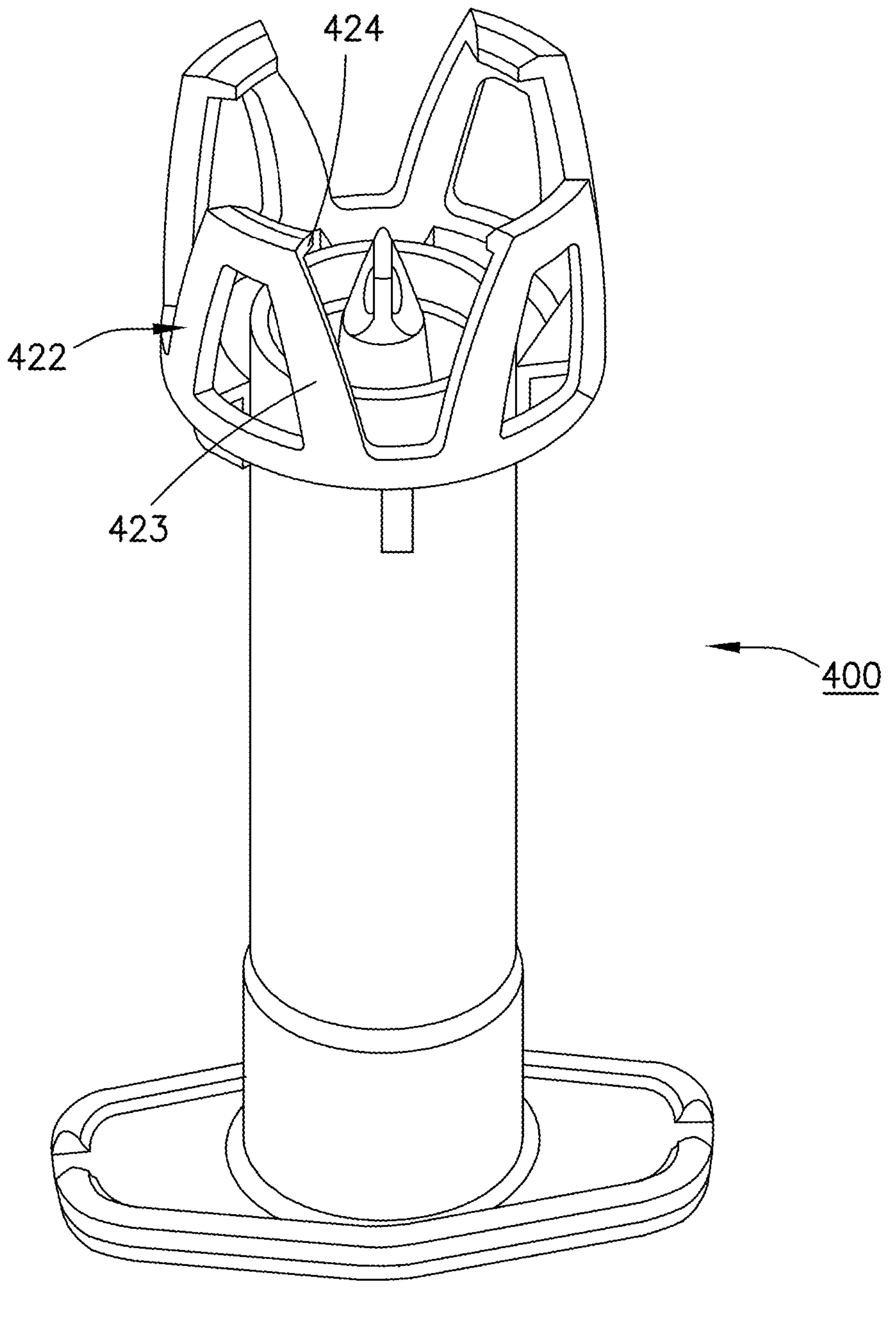
FIG. 12 is an isometric view of another medical device, in accordance with another non-limiting embodiment of the disclosed concept.

In accordance with another exemplary embodiment of the concept, FIG. 12 shows another medical device 400 that may be employed in a medical device assembly in substantially the same manner as the medical device 100 and medical device assembly 2. However, as shown, the medical device 400 is different than the medical device 100. First, the medical device 400 has four deflector members (only one deflector member 422 is indicated in FIG. 12). Second, while the deflector member 422 has an elongated member 423 and a tooth 424 extending therefrom, the elongated member 422 has a through hole.

It will be appreciated that a method of reconstitution of a pharmaceutical composition includes providing the medical device assembly 2, the medical device 100 containing a pharmaceutical composition such as a diluent, connecting the adapter 120 with the vial 20, the vial 20 containing a solid drug, such as a lyophilized pharmaceutical, injecting a quantity of diluent from the medical device assembly 2 into the vial 20, mixing the diluent and the solid drug in the vial to create a reconstituted pharmaceutical composition 25, aspirating the reconstituted pharmaceutical composition 25 from the vial 20 into the body 102, and detaching the adapter 120 from the body 102. The method may also optionally include the steps of removing a spike cap from the spike 106, and optionally injecting the reconstituted pharmaceutical composition 25 into a patient.

Accordingly, the disclosed concept provides for an improved (e.g., without limitation, safer, better in terms of imparting less pain to a patient) medical device assembly 2 and medical device 100, 300, 400 for the same, in which a solid drug such as a vaccine can be mixed with a pharmaceutical composition such as a diluent and thus a reconstituted pharmaceutical composition may be obtained and administered to a patient with a needle 42, 242 that is substantially more sharp and relatively free of burs.

Elements of one disclosed aspect can be combined with elements of one or more other disclosed aspects to form different combinations, all of which are considered to be within the scope of the present concept.

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A medical device configured to be connectable with a vial, the medical device comprising:
- a tubular body defining a container for containing a composition;
- a spike located at a distal end of the body and configured to pierce the vial, the spike having at least one through hole in fluid communication with the container; and
- an adapter for connection of the medical device to the vial formed with or coupled to the body, the adapter being disposed at or about the spike,
- wherein the adapter comprises a wall extending distally from the body, an annular-shaped base portion, and a number of attachment portions extending from the base portion of the adapter, wherein each attachment portion is connected to the spike or the wall, wherein the attachment portions are configured to be irreversibly detached from the spike or wall responsive to rotation of the adapter with respect to the body, and wherein the spike remains connected to the body after the attachment portions are detached.

2. The medical device according to claim 1, wherein the adapter comprises a number of deflector members each configured to be connectable with the vial.

3. The medical device according to claim 2, wherein the number of deflector members is a plurality of deflector members surrounding the spike and being configured to deflect radially inwardly and outwardly with respect to the spike.

4. The medical device according to claim 2, wherein each of the deflector members is configured to be connectable with the vial via a snap-fit mechanism.

5. The medical device according to claim 2, wherein each of the deflector members comprises an elongated member and a tooth extending inwardly from the elongated member toward a longitudinal axis of the body.

6. The medical device according to claim 5, wherein the number of deflector members comprises a first deflector member and a second deflector member disposed adjacent the first deflector member; and wherein the elongated member of the first deflector member is longer than the elongated member of the second deflector member.

7. The medical device according to claim 5, wherein the elongated member has an end portion disposed opposite and distal the tooth; and wherein the elongated member is configured to deflect about the end portion.

8. The medical device according to claim 1, wherein the number of attachment portions is a plurality of attachment portions; and wherein the plurality of attachment portions are each attached to the wall at spaced-apart isolated locations.

9. The medical device according to claim 1, wherein the body and the adapter have a unitary construction.

10. The medical device according to claim 1, wherein the body and the adapter are separately formed and subsequently assembled.

11. The medical device according to claim 1, wherein the adapter comprises an annular-shaped wall; and wherein the spike extends through the annular-shaped wall.

12. The medical device according to claim 11, wherein the wall has a threaded inner surface configured to be threadably connected with a needle hub.

13. A medical device assembly comprising:
a plunger; and
the medical device according to claim 1.

14. A method of reconstitution of a pharmaceutical composition comprising:
providing the medical device assembly according to claim 13;
connecting the adapter with the vial, the vial containing a solid drug;
injecting a quantity of diluent from the medical device assembly into the vial;
mixing the diluent and the solid drug in the vial to create a reconstituted pharmaceutical composition;
aspirating the reconstituted pharmaceutical composition from the vial into the body; and
detaching the adapter from the body.

* * * * *